J. B. GREENE.
HARROW.
No. 190,210. Patented May 1, 1877.
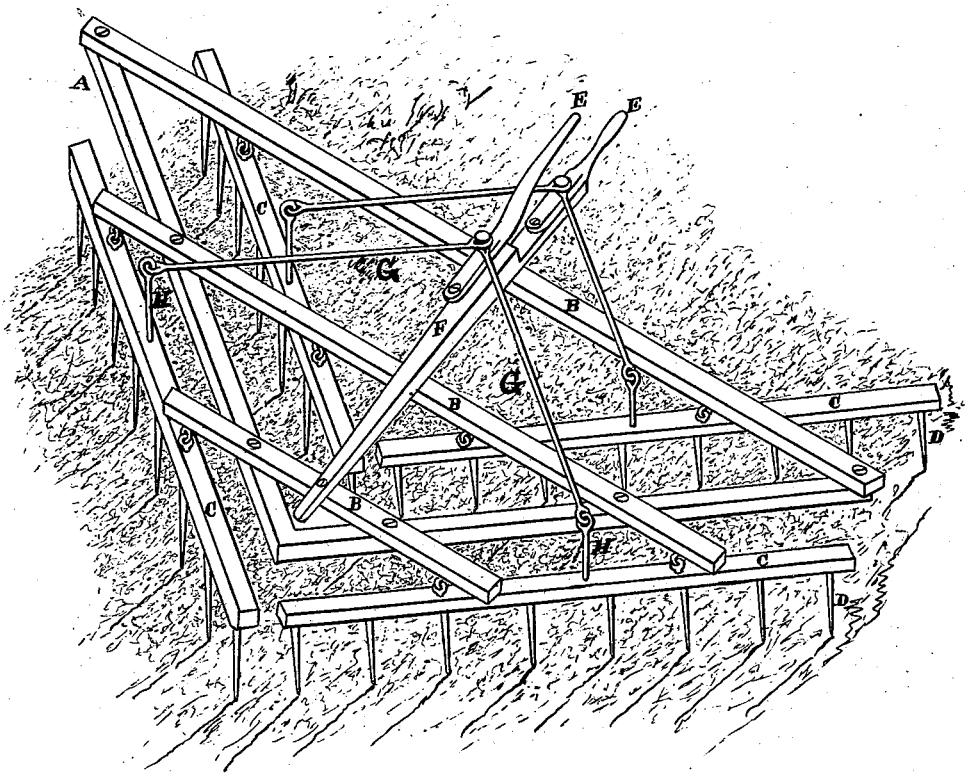
Witnesses
Jno. L. Boone
Qwyn T. Stacy
Inventor
James B. Greene
by Dewey &c.
Attys.

UNITED STATES PATENT OFFICE.

JAMES B. GREENE, OF ELLIOTT, CALIFORNIA.

IMPROVEMENT IN HARROWS.

Specification forming part of Letters Patent No. 190,210, dated May 1, 1877; application filed December 4, 1876.

*To all whom it may concern:*

Be it known that I, JAMES B. GREENE, of Elliott, county of San Joaquin, and State of California, have invented an Improved Harrow; and I do hereby declare the following to be a full, clear, and exact description thereof, reference being had to the accompanying drawings.

My invention relates to a novel construction for that class of farming implements known as harrows or drags, such as are used to pulverize and break up the soil to prepare it for seeding; and it consists in so constructing an A-shaped harrow that the bars or timbers to which the teeth are secured are hinged to a supplemental frame, and by means of connecting rods and levers any one or more of these sets or teeth may be turned alternately so as to relieve themselves of the rubbish which may accumulate before them, and thoroughly clean themselves.

Referring to the accompanying drawings for a more complete explanation of my invention, the figure is a perspective view of my invention.

My harrow is of the A pattern, shown for the present purpose with the timbers meeting in front at a nearly or quite right angle, as this form is more favorable for allowing the teeth to thoroughly clean themselves than a more acute angle. A is a supplemental frame, made triangular in shape, and strengthened by suitable transverse timbers B, which serve as points of attachment for the hinged timbers C. These timbers carry the teeth D, and are hinged or otherwise loosely connected with the supplemental frame, so that the teeth may be allowed to swing backward and forward, as may be desired. In order to control these teeth I employ levers E, which I have in the present case shown as having their fulcrums upon a central timber, F, and having connecting-rods G, which are united to standards or levers H, as shown.

In the present case I have shown two sets of teeth upon each side of the harrow, but it will be manifest that the number may be multiplied or decreased at will, and that two or more sets may be united to be operated by the same lever. The angle at which the teeth stands for ordinary work may be regulated by the length of the rods G, or their point of attachment to the levers E; and by means of a slot they may be adjusted, if desired, to change this angle at will.

The operation of my harrow will then be as follows: When working, ordinarily, the levers E will be retained by a central notch in a curved rack; but when the harrow becomes clogged, the lever E, controlling the front pair of harrows, is released and turned to one side. This movement causes the hinged timber upon that side to turn so that the teeth point backward, and this allows them to be wiped clear of the rubbish or sticky soil that may adhere to them. Meantime the movement of the lever around its fulcrum will point the opposite set of teeth a little forward, and they will continue to work until the lever is turned to the opposite side, when the relative position of these two sets of teeth will be reversed, and the opposite set will be cleaned. While this is being done the rear pair of harrows are still at work, so that there will be no portion of the ground not harrowed; and they will also serve to keep the harrow level, and prevent it from pitching forward with the timbers upon the ground. After the front set are cleaned the lever is set straight, and the rear lever is operated so that the rear pair of harrows will undergo the same operation and become cleaned. If a third set are used they may be so connected that they may be operated simultaneously with the ones before them.

It will be seen that a pair of wheels may be attached to the rear of the harrow and support a seat, in which case the levers E could be made in the shape of a bell-crank, having a connecting-rod extending from the projecting arm to a lever or levers standing at the side of the driver's seat, after the manner of the gang-plow. In some cases, too, the supplemental frame may be jointed longitudinally, so that the two halves would have independent movements and accommodate themselves to uneven ground, although the A form of the harrow overcomes this difficulty to a great extent. By this construction the teeth will be more thoroughly cleaned than if allowed to rotate as in the patent issued to me September 7, 1875, as, instead of simply turning, they are wiped along the ground. The rubbish will not be left in masses, as would be the case when hinged bars extend across a square frame at right angles with the line of travel and are all operated at once by connected levers, in which case there would be patches of uncultivated ground at each cleaning-point. The strain is equal upon each side, and the lever is easily turned; and after the teeth are relieved they will almost return to position by their own weight. If obstructions are encountered upon either side, both levers may be turned at once, and thus both sets of teeth will sweep freely over the obstruction.

When working upon a side-hill the levers E may be set a little to one side, so that on one side they will incline inward, and on the opposite side outward. This will correct any tendencies of the harrow to slide down the hill or turn out of its track.

Having thus described my invention, what I claim as new, and desire to secure by Letters Patent, is—

1. The triangular frame A, having the swinging harrows C hinged to it in pairs on opposite sides of the center, and diagonally to the line of travel, said harrows having suitable operating levers by which alternate sections are inclined backward, either singly or in pairs, so that they are cleaned of dirt and rubbish, substantially as herein described.

2. In combination with the triangular frame A, having the harrows C hinged to it in pairs, and diverging upon each side of a central line, the standards H and connecting-rods G, uniting the opposite pairs of harrows with the operating lever E, so that the harrows are alternately inclined backward to clean them of dirt and rubbish, substantially as herein described.

In witness whereof I have hereunto set my hand and seal.

JAMES B. GREENE. [L. S.]

Witnesses:
JNO. L. BOONE,
OLWYN T. STACY.